United States Patent [19]
Johnson

[11] 3,750,348
[45] Aug. 7, 1973

[54] MEANS AND TECHNIQUE FOR REMOVING FLUX ON A WELDING ROD

[76] Inventor: Robert P. Johnson, 7237 S. 129th, Seattle, Wash. 98178

[22] Filed: Oct. 20, 1971

[21] Appl. No.: 190,761

[52] U.S. Cl............... 51/391, 2/161 R, 51/211 R, 51/328, 51/407, 228/57
[51] Int. Cl..................... B24d 15/04, B24b 1/00
[58] Field of Search............51/39–393, 204, 211 R, 51/407, 328, 281 R; 2/161 R; 228/57

[56] References Cited
UNITED STATES PATENTS

| | | | |
|---|---|---|---|
| 3,643,386 | 2/1972 | Grzyll | 51/391 |
| 2,163,025 | 6/1939 | Dobkowitz | 51/391 X |
| 3,374,487 | 3/1968 | Slimovitz | 2/161 R |
| 2,756,549 | 7/1956 | Macullar | 51/391 |
| 2,804,729 | 9/1957 | Dahlstrom | 51/391 X |
| 203,959 | 5/1878 | Townsend | 2/161 R |
| 3,151,333 | 10/1964 | Scholz | 2/161 R |
| 2,459,985 | 1/1949 | Woodbury | 2/161 R |
| 645,406 | 3/1900 | Potter | 2/161 R |
| 3,705,680 | 12/1972 | Siegel | 228/57 |

FOREIGN PATENTS OR APPLICATIONS

| | | | |
|---|---|---|---|
| 585,417 | 2/1947 | Great Britain | 51/391 |

Primary Examiner—Donald G. Kelly
Attorney—Christensen & Sanborn

[57] ABSTRACT

The re-fused flux on the tip of a welding rod, is removed by striking the tip against an abrasive surface defined by a strike-plate on the overside of one of the welder's gloves.

11 Claims, 3 Drawing Figures

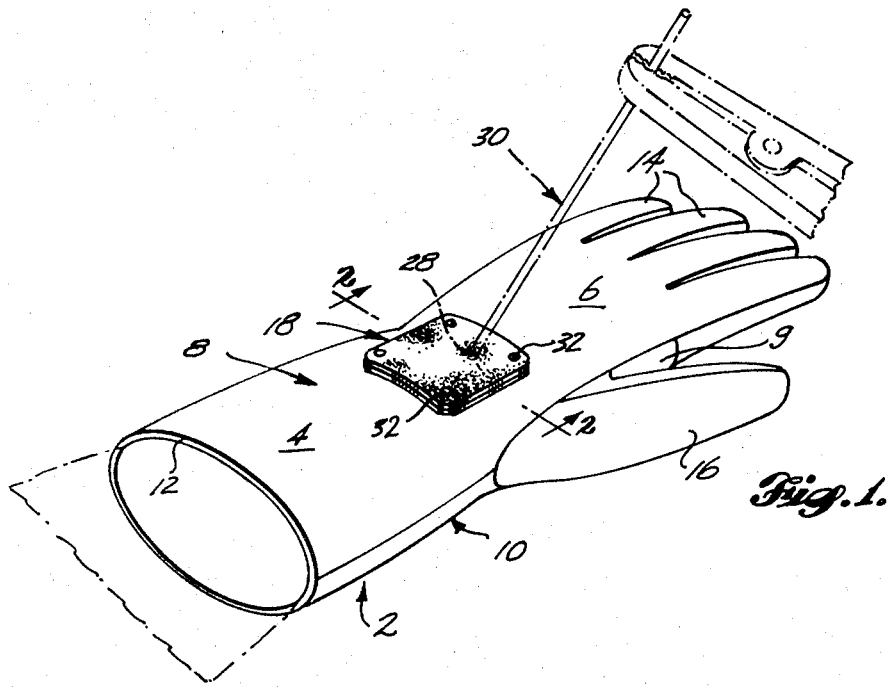
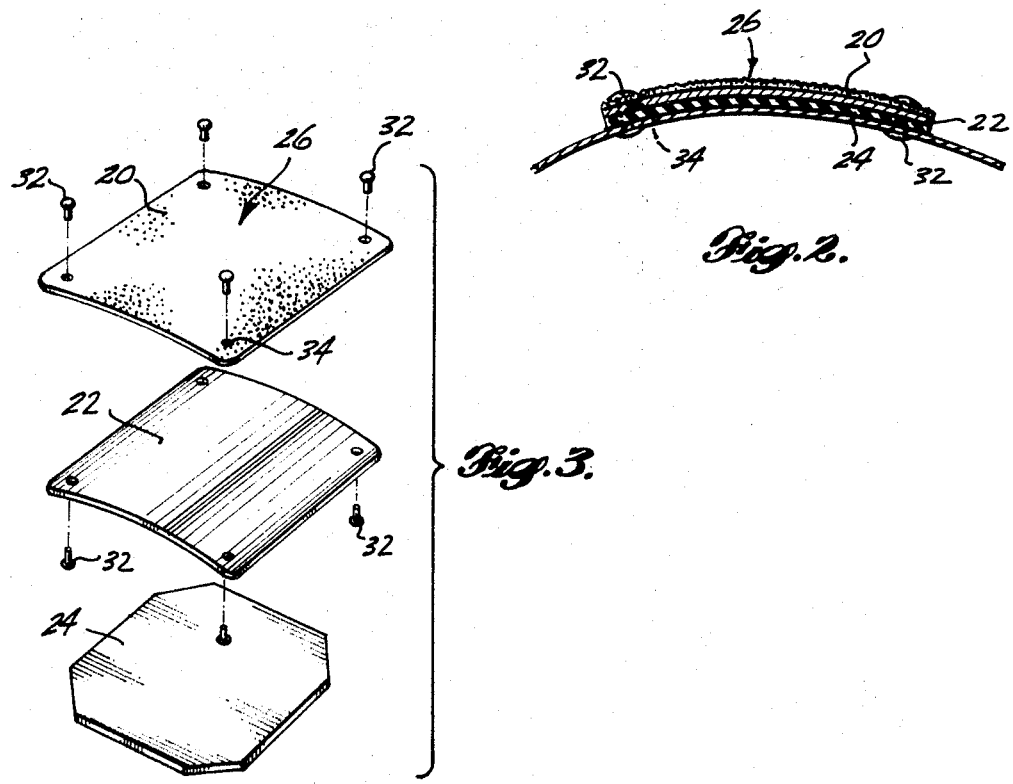

MEANS AND TECHNIQUE FOR REMOVING FLUX ON A WELDING ROD

BACKGROUND OF THE INVENTION INCLUDING CERTAIN OBJECTS THEREOF

If the tip of a welding rod is to make immediate contact with the work surface, when applied thereon, it is important that it not be covered by so-called "frozen-over" flux which has re-fused from the previous usage of the rod. Therefore, welders commonly either break off the re-fused flux with the thumb and first finger of their other hand, or tap the tip of the rod against the work piece to develop sufficient cracks in the re-fused flux to cause it to slough off.

One object of the present invention is to provide a means and technique whereby welders can remove the fused or re-fused flux on the tip of their welding rod, without cutting, burning, or otherwise abusing their gloves as a result of handling the hot, sharply defined tip of the rod in the foregoing fashion. Another object is to provide a means and technique of this nature whereby welders can remove the flux without the spoilage or waste, or work inaccuracies, or time losses which result from tapping the rod against the work in the foregoing fashion, which tapping often cracks off an excess of the flux above the tip, thus spoiling the rod, or knocks parts of the work piece out of place with respect to the condition prescribed for them. A further object is to provide a means and technique of this nature whereby welders can remove the flux without the necessity for raising their helmet, and moreover, can remove the flux while positioned on a ladder or the like, without the necessity for releasing their grip on the ladder to do so. Still further objects and advantages will become apparent from the description of the invention which follows hereafter.

SUMMARY OF THE INVENTION

These objects and advantages are realized by a means and technique of my invention wherein at least one of the welder's gloves is equipped with a strike-plate on preferably the overside thereof, which plate has one surface thereof exposed to the ambient surroundings of the glove, on the outside of the overside, and the surface is abrasive to the fluxed tip of a welding rod, and sufficiently rigidly defined by the plate to enable the welder to remove flux from the tip by striking the same on the surface. The plate is preferably a laminar composite of at least two relatively superposed layers, the underlayer of which is relatively resilient, and the overlayer of which is rigid, and has abrasive means such as a sheet of sandpaper on the outer surface thereof, defining the exposed surface of the plate. Moreover, the plate normally occupies only a localized portion of the overside of the glove, preferably adjacent the boundary between the cuff and back portions thereof, so that said portions extend free of the plate for a substantial distance in the directions of the edge of the cuff, and the fingers of the glove, respectively, to preserve the flexibility of the glove for the wearer's ease and comfort during the welding operation.

In the presently preferred embodiments of the invention, the plate is superposed on the glove as a patch which is secured to the outside of the overside of the glove. Also, the patch is removably fastened to the glove, as for example, by rivets secured adjacent the corners of the patch. In this way, the patch may be readily separated from the glove, for replacement of one or the other when it is worn out.

BRIEF DESCRIPTION OF THE DRAWING

These features will be better understood by reference to the accompanying drawing which illustrates one of the preferred embodiments.

In the drawing,

FIG. 1 is a perspective view of a leather glove equipped with such a patch, illustrating its use;

FIG. 2 is a cross-sectional view of the patch along the lines 2—2 of FIG. 1;

FIG. 3 is an exploded view of the respective layers of the patch.

DESCRIPTION OF THE PREFERRED EMBODIMENT

Referring to the drawing, it will be seen that the glove 2 has a cuff portion 4 and a back portion 6 defining the overside 8 of the glove, and a palm portion 9 which together with the cuff portion 4 defines the underside 10 of the glove. The cuff portion 4 extends about the wrist to the seamed-edge 12 thereof, whereas the back and palm portions 6 and 9, terminate at the fingers 14 and thumb 16 of the glove.

Superimposed on the outside of the overside 8 of the glove, adjacent the boundary between the cuff portion 4 and the back portion 6 of the same, is a relatively small, built-up patch 18 of slightly arched configuration which is laminated from a composite of three superposed layers 20, 22, and 24 of differing materials that are resin-bonded to one another to provide a strike surface 26 for the tip 28 of a welding rod 30, as illustrated. The top layer 20 defines the surface 26 and consists of a sheet of fiber-backed, coarse-grained abrasive paper. Ordinary sandpaper is suitable, but the more durable abrasive papers having a surface of abrasive particles dispersed in a resin are preferred. The intermediate layer 22 is rigid and consists of a formed metal plate. The bottom layer 24 is relatively resilient to protect the wearer's hand against bruising, and consists of a corner-mitered rubber pad. The patch 18 is essentially square-shaped and is apertured at each corner to be fastened to the glove 2 by means of rivets 32 passed through the apertures 34 therein. When the glove 2 is worn and unusable, the patch 18 may be removed and fastened to a new glove.

As seen, the action of "striking" the tip 28 against the surface 26 of the patch, somewhat resembles the action of striking a match in "lighting" the same.

The sheet of abrasive paper is preferably secured to the intermediate metal plate by means of an adhesive which will permit easy substitution of a fresh sheet for one that has become excessively worn. It also may be preferable to have the sheet of abrasive paper cover the rivet heads so that electricity cannot be accidentally transmitted from the welding rod to the wearer's hand via a rivet.

I claim:

1. In combination, a glove for a welder having interconnected palm, back, cuff, and finger portions which together cover the welders's entire hand on both the underside and overside thereof, and a substantially hard, rigid plate connected to the glove in a fixed position of one of the palm, back, and cuff portions thereof, and in substantially flatwise orientation with respect to the outer surface of the glove, so that one surface of the plate is exposed to the outside of the glove, said plate surface being sufficiently large in exposed area that the welder can strike the fluxed tip of his welding rod against the plate at the surface thereof, and in addition, bieng sufficiently hard and abrasive in character that the plate will remove the flux from the tip during the striking action.

2. The combination according to claim 1 wherein the plate is disposed on the overside of the glove, and occupies only a localized portion of the overside, adjacent the boundary between the cuff and back portions of the glove, so that said portions extend free of the plate for a substantial distance in the directions of the edge of the cuff portion, and the finger portions, respectively.

3. The combination according to claim 1 wherein the plate is superposed on the overside of the glove as a patch.

4. The combination according to claim 3 wherein the patch is removably fastened to the glove.

5. The combiantion according to claim 4 wherein the patch is fastened to the glove by rivets secured adjacent the corners of the patch.

6. The method of hand-welding two components while wearing gloves on the hands, comprising manipulating a welding rod with one of the gloved-hands, contacting the tip of the rod with a joint between the two components, to form a weld thereon, and alternately striking the tip of the rod against an abrasive surface on one of the cuff, palm, and back portions of the glove on the other hand, to remove the flux from the tip.

7. The combination according to claim 1 wherein the plate surface has a slightly arched configuration.

8. The combination according to claim 1 wherein the plate is backed by an underlayer of resiliently yieldable material which operates to cushion the welder's hand against bruising.

9. The combination according to claim 1 wherein the plate is overlaid by a sheet of particlized abrasive material.

10. A patch which is attachable to a welder's glove to form a strike surface thereon for a fluxed welding rod, comprising a pad of resiliently yieldable cushioning material, a rigid metal plate overlaid on the pad and secured face-to-face therewith, and means on the plate for securing the composite of the pad and plate to the glove, said plate having an exposed upper surface which is sufficiently large in area that the welder can strike the fluxed tip of his rod against the same, and which is sufficiently hard and abrasive in character that the surface will remove the flux from the tip during the striking action.

11. A patch according to claim 10 wherein the plate has a sheet of sandpaper adhered to the upper surface thereof.

* * * * *